US009803671B2

(12) United States Patent
Egaña Arrieta

(10) Patent No.: US 9,803,671 B2
(45) Date of Patent: Oct. 31, 2017

(54) DEVICE FOR JOINING METAL PROFILES

(71) Applicant: Joseba Egaña Arrieta, San Sebastián (ES)

(72) Inventor: Joseba Egaña Arrieta, San Sebastián (ES)

(*) Notice: Subject to any disclaimer, the term of this patent is extended or adjusted under 35 U.S.C. 154(b) by 0 days.

(21) Appl. No.: 15/117,279

(22) PCT Filed: Feb. 12, 2014

(86) PCT No.: PCT/ES2014/070102
§ 371 (c)(1),
(2) Date: Aug. 8, 2016

(87) PCT Pub. No.: WO2015/121509
PCT Pub. Date: Aug. 20, 2015

(65) Prior Publication Data
US 2017/0016465 A1   Jan. 19, 2017

(30) Foreign Application Priority Data
Feb. 12, 2014 (ES) .................................. 201430190

(51) Int. Cl.
F16B 7/04 (2006.01)
(52) U.S. Cl.
CPC .................. F16B 7/0446 (2013.01)
(58) Field of Classification Search
CPC .... F16B 7/0446; F16B 7/0413; Y10T 403/16; Y10T 403/1666; Y10T 403/1674;
(Continued)

(56) References Cited

U.S. PATENT DOCUMENTS 4,610,565 A   9/1986 Nakayama
4,714,373 A   12/1987 Heekin
(Continued)

FOREIGN PATENT DOCUMENTS

DE         3122934 A1    12/1982
DE    102015102861 A1 *  9/2016  ............ F16B 5/0628
(Continued)

OTHER PUBLICATIONS

International Search Report, counterpart International Appl. No. PCT/ES2014/070102 (dated Oct. 31, 2014) with English Translation, 4 pages.

Primary Examiner — Jonathan Masinick
(74) Attorney, Agent, or Firm — Cook Alex Ltd.

(57) ABSTRACT

The invention relates to a device for joining metal profiles provided with longitudinal surface grooves, said device comprising: a metal support (1) that can be inserted into the ends of the grooves of the profiles to be joined; a chassis (2) supported on each end of said metal support (1), whereon a lever (4) provided with a projection (9) and a coaxial cam (8) pivots (5); and a resilient body (3) inserted between the support (1) and the chassis (2). When the lever (4) is rotated into the represented closing position thereof, the protrusion (9) penetrates said resilient body (3), expanding it transversely against the side walls of the respective groove, and the cam (8) simultaneously compresses the resilient body (3), expanding the device in a direction which is orthogonal to the previous direction. The device allows a rapid, manual and toolless assembly and disassembly of the profiles, aligned or at an angle, in order to form frames such as those used in supports for displaying graphics.

9 Claims, 2 Drawing Sheets

Figure 1:
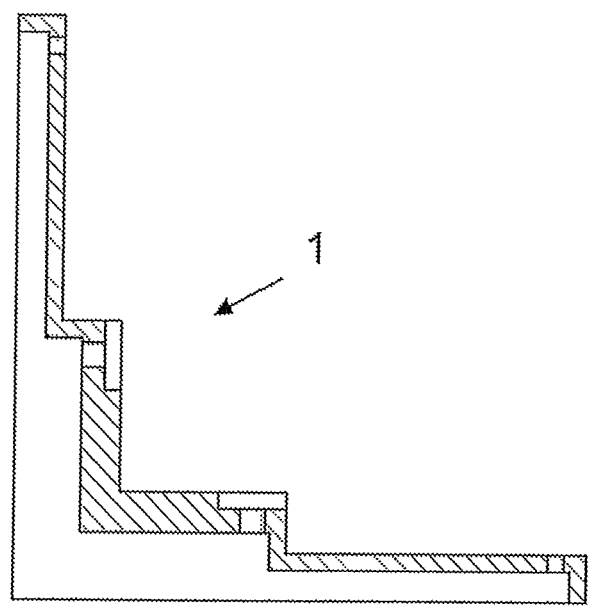

(58) Field of Classification Search
CPC ......... Y10T 403/725; E04B 2001/2406; E04B 2001/2451; E04B 1/5831
See application file for complete search history.

(56) References Cited

U.S. PATENT DOCUMENTS

| | | | |
|---|---|---|---|
| 5,479,733 A | 1/1996 | Kusina | |
| 6,405,467 B1 * | 6/2002 | Dedlow | A47G 1/0605 40/782 |
| 2011/0176860 A1 | 7/2011 | Lin | |
| 2014/0270925 A1 * | 9/2014 | Lambertson, Jr. | B05B 15/06 403/299 |

FOREIGN PATENT DOCUMENTS

| | | | | |
|---|---|---|---|---|
| FR | 2590943 A1 * | 6/1987 | ......... | A47B 47/0016 |
| FR | 3034823 A1 * | 10/2016 | ............. | F16B 7/185 |
| JP | 2007117406 A | 5/2007 | | |

\* cited by examiner

DEVICE FOR JOINING METAL PROFILES

The present invention relates to an assembly and disassembly device, which is especially suited for the assembly and/or disassembly of metal profiles that comprise cavities with an at least partially opened square cross-section, that are especially suited to define frames as those used in supports for displaying graphics.

The device according to the invention allows the manual and tool-free assembly and disassembly of a pair of profiles of the type indicated above, both in order to join them to form a straight line, for instance to increase the length of the final assembled support, or to obtain a certain angle, 90° for instance, to define a right angle.

Within the field of supports used to display graphics, and in particular to allow the adaptation of the frames intended to support different graphic elements, said frames must be adapted to such graphic elements. When it comes to the transportation, packaging and/or storage, frequently the shape, nature or size of such frame represents a serious problem. Thus, they must be handled already assembled, with the subsequent inconveniencies arising from their size, for instance, or they can also be disassembled or otherwise split into smaller parts, for ease of handling, but they must be subsequently reassembled, with the help of the appropriate tools.

European Patent EP 1580341, corresponding to ES 2 345 050 T3, describes a joining element for the construction of profiles wherein such joining element establishes a "detachable" joint comprising at least two profile bars mutually arranged at an angle, wherein each one of such bars comprises, at least, a longitudinal surface groove provided with an undercut bounded by a bottom surface and two ribs running in parallel with this latter, such elements comprising two flanges making an angle with each other and provided with attachment means, wherein the said flanges can be attached to the profile bars.

Similarly, document ES 1 075 309 U relates to a joining device for aluminium profiles, basically comprising a fixed and a moving element, as well as other ancillary elements, wherein the moving and the fixed parts are connected by means of a dovetail connection, and wherein the initial end of stroke consists of two pre-assembly stops belonging to the fixed part. The fixed part comprises a retaining stud arranged between two supporting shoulders whose axis is perpendicular to the base of the fixed part and wherein the movable part has a pushing stud whose axis forms an angle of approximately 28° with respect to the base of the fixed part. The fixed part has a stud end support area, while the movable part comprises two locking tabs inside its head that are symmetrically arranged about the long axis of said head. The assembly is done by screwing the retaining studs of each one of the parts to the relevant base.

The present invention is aimed at providing an assembly and disassembly device for the joining of metal profiles comprising cavities with a square cross-section, allowing manual and tool-free assembly and disassembly operations, that can be easily and quickly performed, both for joining straight profiles, for instance, to increase the length of the final assembled frame, or to obtain a certain angle, 90° for instance, to define a right angle. Furthermore, the device according to the invention allows preserving the structural integrity of the graphics display support, even after many assembly/disassembly operations, and facilitates its transportation and storage.

To that effect, the present device comprises a metal support means, that can be straight or angled, each end of the said metal supports incorporating a chassis wherein a resilient body has been inserted, and comprising an actuation lever. Such lever includes a rotation axis and attachment means for the fixing to the support.

In order of use, the ends of the device are introduced, as a stem, in the grooves of the profiles to be joined, the said profiles being joined by the actuation of the levers and the subsequent expansion of the resilient bodies, both transversely against the side walls of the respective groove, and perpendicularly, so that a perfect assembly is obtained, which provides structural integrity to the whole assembly.

Similarly, when the levers are operated in the opposite direction, the device is released from the profiles.

The following paragraphs show an exemplary embodiment of the device according to the invention, on the basis of the attached figures, where the following has been depicted;

FIG. 1: shows a side view of a cross-section of the metal support of the device, for an embodiment forming an angle of 90°.

Figure 2:
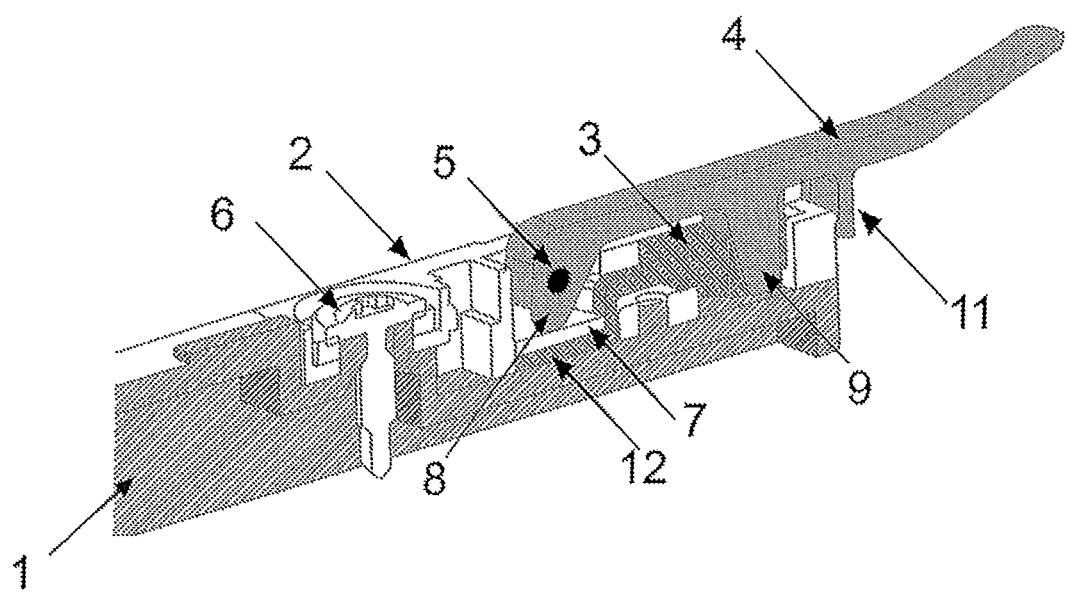

FIG. 2: shows a detailed partial cross section view of one of the ends of the device according to the invention, in the closed position.

Figure 3:
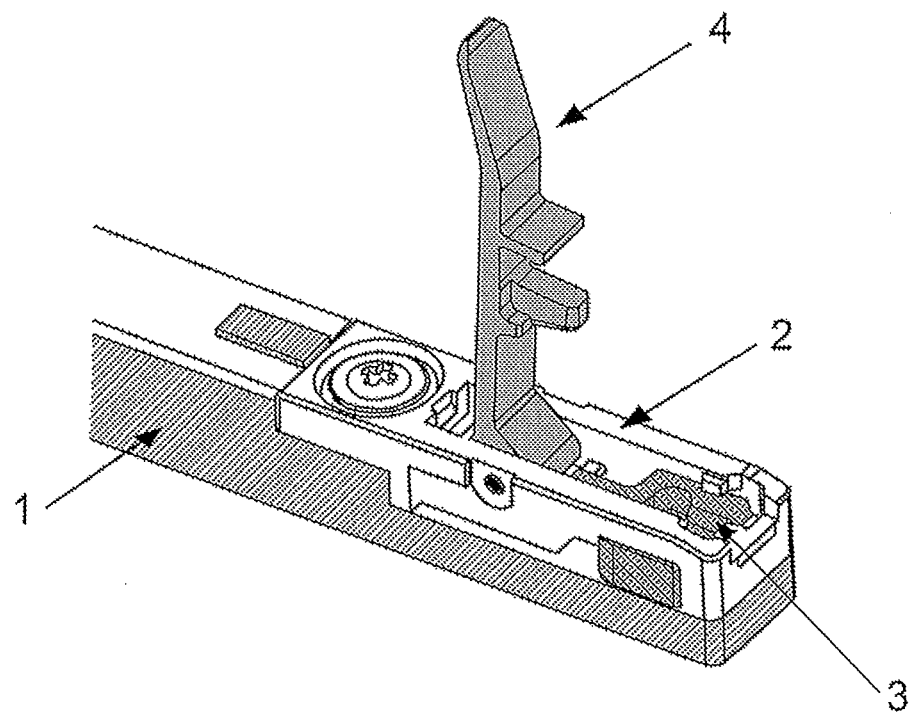

FIG. 3: shows a detailed perspective view of one of the ends of the device according to the invention, in the open position.

Figure 4:
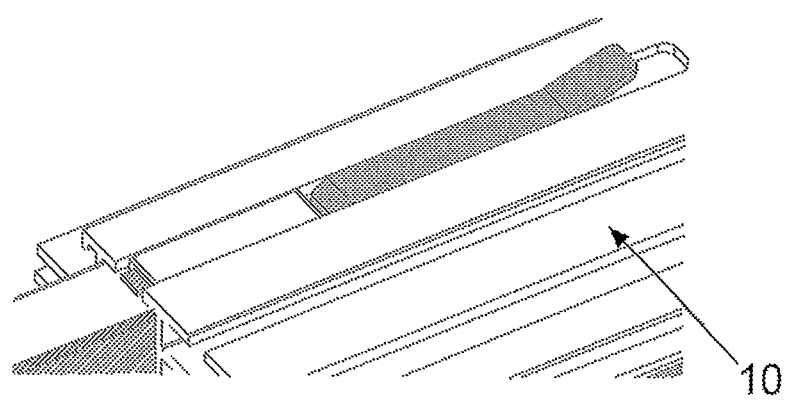

FIG. 4: Shows a perspective view of the device according to the invention, in the closed position and in operation.

The device according to the invention is based on a metal support (1) that can be indistinctly straight or angled. FIG. 1 shows an embodiment where the support (1) forms an angle of 90°.

Referring to FIG. 2, this figure shows a detailed partial cross section view of one of the ends of the device; although the other end is not shown, it is identical to the first one, but following a symmetrical pattern.

As it can be observed in FIGS. 2 and 3, the end of the metal support (1) comprises cavities that may respectively house a resilient body (3), a chassis (2) and, if appropriate, a fixing screw (6) and the relevant elastic joint to fix the chassis (2) to the metal support (1), and which is intended to absorb the vertical movement of the device. Optionally, such screw (6) may be covered with a lid, to provide an aesthetically appropriate finish to the device.

The chassis (2), which may be used as a frame, allows spatial distribution arrangement of the aforementioned elements located on the support and provides structural integrity to the whole assembly. The central part of the chassis (2) also comprises a straight-through opening to house a transverse rotation axis (5), which facilitates the rotation of a lever (4).

The said lever (4) may rotate 90° around its axis, designed as a cam (8) and which is located at one of its ends. In the longitudinal direction of the lever (4) and correspondingly with the resilient body (3), the lever comprises a transverse projection (9), so that, when the lever (4) rotates 90° in the direction of the support (1), during the closing operation, the said transverse projection (9) exercises a lateral pressure on the resilient body (3), which expands towards the sides to fit the shape of the profile (10) (see FIG. 4). To keep it in the closing position, the lever (4) shows a projection (11) that engages the relevant flange arranged at the end of the chassis (2).

At the side opposite to the cam (8), the lever (4) comprises an extension used as an actuator, to lock and unlock the device.

On the other hand, the resilient body (3) housed inside the chassis (2) on the metal body (1) is arranged on the basis of a structure that may house the transverse projection (9) of the lever (4), extending longitudinally towards the cam (8). Between the said cam (8) and this extension (12) of the resilient body (3), a metal plate (7) is arranged. During the closing operation, the cam (8) vertically presses the metal plate (7) which, in turn, provokes an elastic deformation of the extension (12) caused by pressure, generating an opposite vertical reaction exercised on the cam (8) and, consequently on the whole device, against the profile, thus providing stability to the frame assembly comprising the relevant profiles and devices according to the invention.

In an embodiment of the invention, the metal support (1) is made of a light and resistant metal alloy, and preferably, a zinc alloy containing aluminium, magnesium, and copper (zamak).

The invention claimed is:

1. An assembly and disassembly arrangement comprising:
   a device for the assembly and disassembly of metal profiles (10) that comprise cavities with an at least partially opened square cross-section, the device arranged on a metal support (1) whose ends comprise recesses housing the device;
   the device comprising a resilient body (3) and a chassis (2), wherein a central part of the chassis (2) comprises a passing-through opening which houses a transverse rotation axis (5), facilitating the rotation of a lever (4), rotatable 90° around the axis, the lever comprising a cam (8) located at one end of the lever;
   the lever corresponding, in a longitudinal direction, with the resilient body (3), the lever comprises a transverse projection (9), so that when the lever (4) rotates 90° in the direction of the metal support (1), during a closing operation, the transverse projection (9) exercises a lateral pressure on the resilient body (3), which expands laterally to fit the shape of the profile (10);
   the resilient body (3) located inside the chassis (2) and positioned on the metal support (1), is arranged to house, in the closing position, the transverse projection (9) of the lever (4), extending longitudinally to define an extension (12) towards the cam (8);
   the device further comprises a metal plate (7) is provided between the cam (8) and the extension (12) of the resilient body (3) so that, during the closing operation, the cam (8) exercises pressure vertically on the metal plate (7) which, in turn causes an elastic deformation of the extension (12) as a result of the pressure, generating an opposite vertical reaction on the cam (8) and, consequently, on the device assembly as a whole, against the profile (10).

2. The assembly and disassembly arrangement according to claim 1, wherein the metal support (1) is arranged following a straight line.

3. An assembly and disassembly device according to claim 1, wherein the metal support (1) forms an angle.

4. The assembly and disassembly arrangement according to claim 3 wherein the angle is a 90° angle.

5. The assembly and disassembly arrangement according to claim 1, wherein the lever (4) comprises a projection (11) which engages a flange located at the end of the chassis (2), to keep it in the closing position.

6. The assembly and disassembly arrangement according to claim 1, wherein the said device comprises a fixing screw (6) to fix the chassis (2) to the metal support (1).

7. The assembly and disassembly arrangement according to claim 6, wherein the screw (6) is covered by a lid.

8. The assembly and disassembly arrangement according to claim 1, wherein the metal support (1) is made of a resistant and light metal alloy.

9. The assembly and disassembly arrangement according to claim 8 wherein the light metal alloy comprises a zinc alloy containing aluminum, magnesium, and copper.

* * * * *